United States Patent

Henry et al.

[15] 3,685,250
[45] Aug. 22, 1972

[54] CAM INTERRUPTED SEALING JAWS FOR PRODUCT STRIPPING

[72] Inventors: Nelson R. Henry; Donald R. Middour, both of Decatur, Ga.

[73] Assignee: The Woodman Company, Inc., Decatur, Ga.

[22] Filed: July 9, 1970

[21] Appl. No.: 53,391

[52] U.S. Cl. .................................... 53/180, 53/373
[51] Int. Cl. ........................................... B65b 51/30
[58] Field of Search .................. 53/28, 190, 182, 373

[56] References Cited

UNITED STATES PATENTS

| | | | |
|---|---|---|---|
| 3,347,015 | 10/1967 | Nutting et al. | 53/182 |
| 2,966,021 | 12/1960 | Lane et al. | 53/182 |
| 3,027,695 | 4/1962 | Leasure | 53/28 |

*Primary Examiner*—Theron E. Condon
*Assistant Examiner*—Eugene F. Desmond
*Attorney*—Lowe and King

[57] ABSTRACT

An arrangement for stripping a packaging tube to remove product from the seal area is provided wherein the stripping plates may be conveniently mounted on the sealing jaws and brought into stripping engagement by single pneumatic cylinder and interrupter cam arrangement. Specifically, a follower roller is carried by the toggle linkage and cylinder that actuates the sealing jaws and said roller engages a stationary cam mounted on the frame of the machine to interrupt the inward movement of the jaws short of sealing engagement; i.e., in the stripping position. After stripping, the follower roller passes over a sloping exit section of the dam for controlled release of the sealing jaws to the sealing and drawing out position. The cam assembly is made of a base member having a central channel for slidably receiving an elongated cam element. The cam element is cushioned by a resilient pad to absorb the shock of the engagement by the follower roller; the cam element being held on the base member by a pin and slot arrangement.

10 Claims, 5 Drawing Figures

INVENTOR,
NELSON R. HENRY
DONALD R. MIDDOUR
BY
Lowe & King
ATTORNEYS

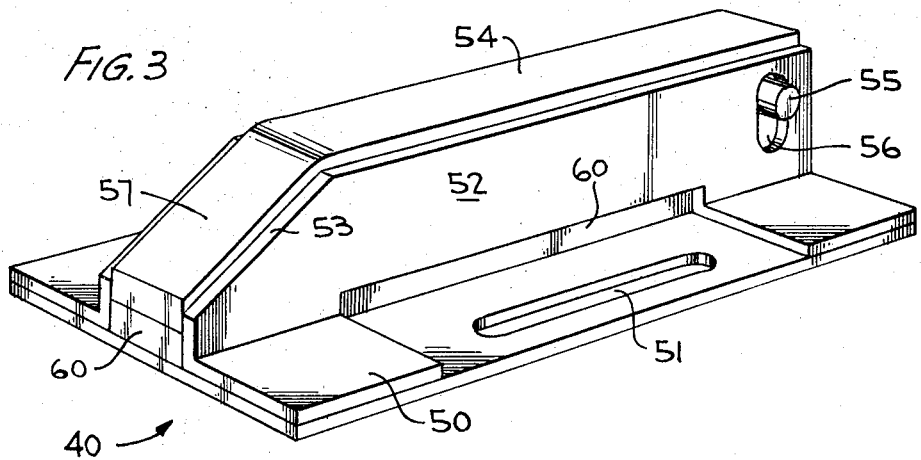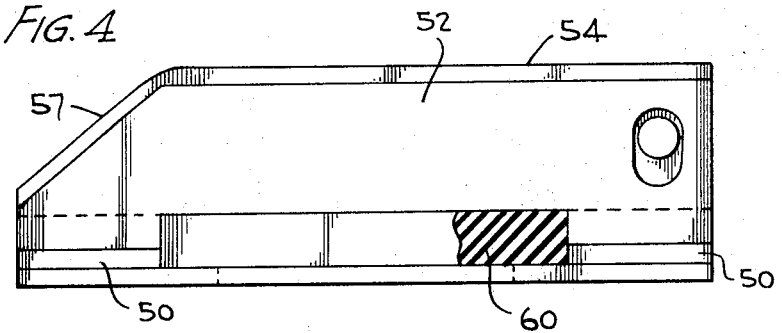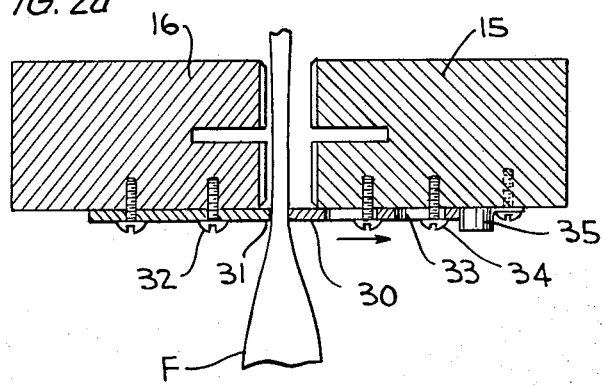
INVENTORS,
NELSON R. HENRY
DONALD R. MIDDOUR
BY Lowe & King
ATTORNEYS

CAM INTERRUPTED SEALING JAWS FOR PRODUCT STRIPPING

The present invention relates to packaging machines and, more particularly, to an improved product stripping apparatus for reciprocatory sealing jaws utilized to form successive packages from a tube of packaging film. OF THE INVENTION In a form and fill packaging system, packaging film or material is fed from a roll and transformed into a tube by passing over a former and then heat sealing the opposite longitudinal edges together. A pair of heat-sealing jaws are next brought together against the tube to form the transverse seals, thereby completing the pillow-like package below by forming the top seal thereof, and simultaneously forming the bottom seal for the next package above. After each package has been formed, the carriage for the sealing jaws moves downwardly to draw out another package length of film and the package below is separated by cutting across the sealed area, whereupon the operation is repeated for the next package.

Before each transverse seal is formed by the sealing jaws, the product being packaged is inserted through the top opening of the tube. The length of the package is made so as to be just long enough to accommodate the quantity of product in order to conserve packaging material and to make the package as small as possible for easier handling. Under normal circumstances, the product must thus be settled into a compact mass in order to fit the confined space of the package. Under most circumstances, we have found that the most efficient settling action is performed by a Vibrating Clamp Product Settler, disclosed and claimed in copending application of that title, Ser. No. 18,934, filed Mar. 12, 1970, continuation-in-part of Ser. No. 714,862, element Mar. 21, 1968. This vibrating settling action assures that no product is left in the seal area to cause a defective seal and at the same time prevents breakage of the product.

However, in packaging certain products which are extremely bulky, such as large diameter potato chips, it is still desirable to utilize the older method of clearing the seal area by stripping along the tube just below the sealing jaw and accept the breakage of the product attendant to this method. Thus, as is well known, a pair of stripping plates are mounted on the bottom of the sealing jaws and project outwardly from the face of the jaws. The sealing jaws are brought together in two steps as the carriage is moving downwardly; first, just sufficiently to bring the stripping plates into engagement to flatten the tube to strip the product, and second, the final closing movement of the jaws together to form the seal and draw out the next package length. Previously, this two-stage action has been performed by a number of arrangements, such as by providing an actuating cylinder wherein double concentric piston rods are provided; the initial travel being to actuation of one piston rod along its length and the final movement being by movement of the other piston rod. This arrangement and the others of the prior art necessitate the use of a relatively expensive fluid handling system including multiple servo valves to operate the cylinder in sequence and an electrical operating system to control the valves.

Thus, there is a need for a simplified and more efficient stripping arrangement for those packaging machines requiring the same, and it is a main object of the present invention to provide such a system.

It is another object of the present invention to provide a system for operating sealing jaws with strippers in the required two-step sequence without the use of additional fluid and electrical systems, servo valves or microswitches.

It is still another object of the present invention to provide sealing jaws with stripper arrangement that relies on the simple principle of interruption of the normal jaw travel to perform the stripping step with subsequent release to perform the sealing and drawing out step.

BRIEF DESCRIPTION OF THE INVENTION

The sealing jaws are mounted on a carriage for actuating movement toward and away from each other to form the transverse seals in a tube of packaging material. The sealing jaws have resilient stripper plates below and extending beyond said sealing jaws. The jaws have operating movement in the direction of the longitudinal axis of the tube so as to strip the product and then seal and draw out a new package length. In accordance with the preferred embodiment of the invention disclosed, a cam is mounted in a stationary position on the machine frame adjacent the rear of the sealing carriage. A follower roller is carried by the end of the actuating cylinder and as the cylinder is extended at the top of the carriage stroke, the roller is adapted to engage the cam and thereby interrupt the inward travel of the sealing jaws short of sealing engagement. Thus, when the carriage is first moved from its uppermost position downwardly, only stripping of the product occurs. Then, as the sealing carriage is moved further downwardly, the roller leaves the cam surface whereby the final or second portion of the inward sealing jaw travel is accomplished and the sealing occurs.

Preferably, the sealing jaws are actuated by a single pneumatic cylinder through a toggle linkage arrangement described and claimed in the copending application, entitled "Sealing Carriage," Ser. No. 863,834, filed Oct. 6, 1969, now U.S. Pat. No. 3,616,087, issued Oct. 26, 1971, of which we are coinventors and which is assigned to the same assignee as the present application. The toggle arrangement of that invention is particularly suited for use with the stripping apparatus of the present invention since the velocity of the sealing jaws nearing the stripping position is reduced and thus the momentum of the traveling linkage and jaws is proportionally reduced. This reduction in momentum advantageously reduces the initial impact or shock force of the follower roller engaging the cam.

Furthermore, the construction of the cam is such as to further reduce the shock or impact of the parts coming together. The cam assembly includes a base member having an upstanding channel along the center thereof. An elongated cam element is positioned within the channel for in-and-out movement. Behind the cam element is a rubber pad to cushion or absorb the blow of the cam follower. The upper end of the cam is mounted by a pin and slot arrangement for pivotal movement as well as movement toward and away from the base to give further flexibility to the cushioning action. A downwardly sloping exit section of the cam is provided to allow controlled release of the sealing jaws to the sealing position.

Still other objects and advantages of the present invention will become readily apparent to those skilled in this art from the following detailed description wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

In the drawings:

FIG. 2a is a detailed showing of the resilient mounting of the stripper plates on the sealing jaws;

FIG. 3 is a perspective view of the interrupter cam assembly for stripping; and

FIG. 4 is a side view with a portion cut away and in cross section, of the cam assembly of FIG. 3.

DETAILED DESCRIPTION OF THE INVENTION

Figure 1:
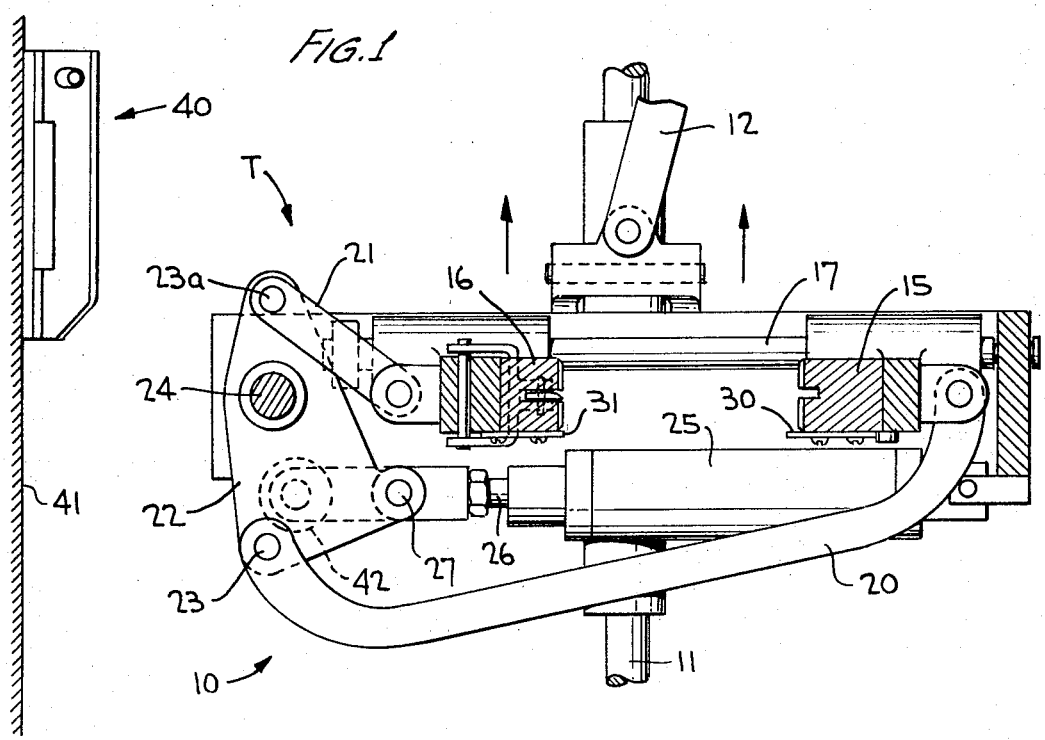
FIG. 1 is a side view, in cross section, showing the sealing jaw carriage and the interrupter cam of the present invention mounted adjacent thereto, with the sealing jaw carriage approaching the uppermost travel position.
Figure 2:
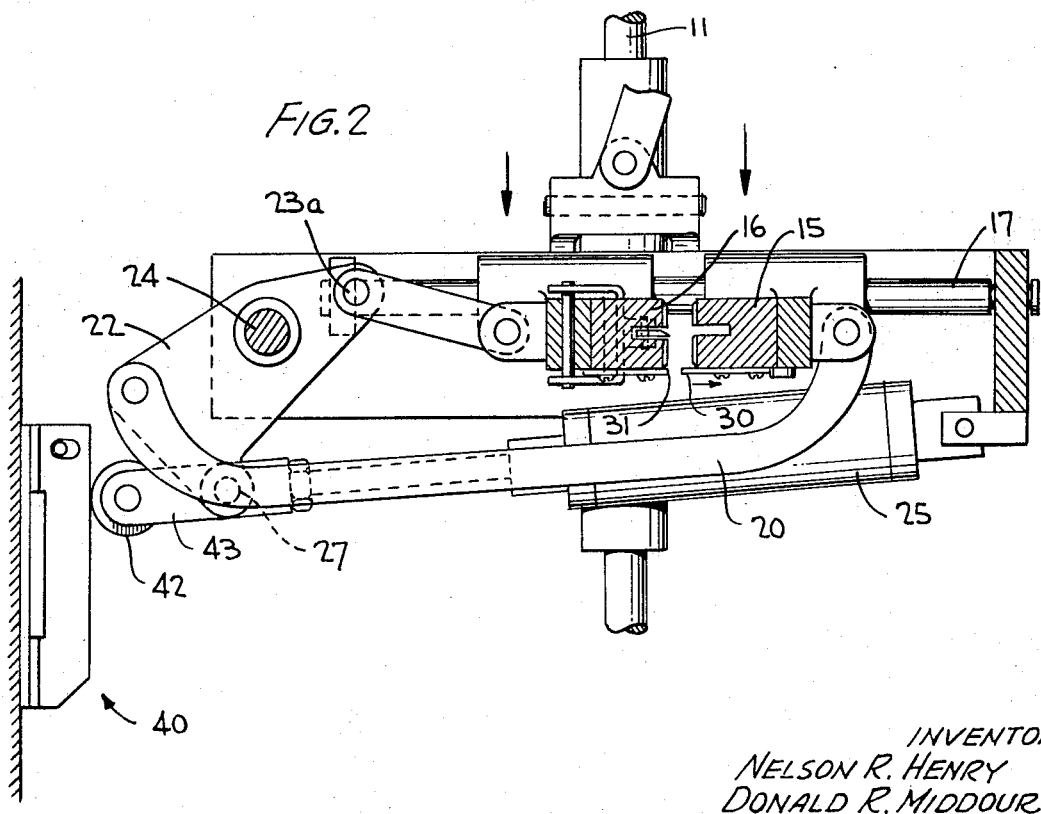
FIG. 2 is a cross-sectional view with the sealing jaws moved partially inward to the stripping position and the carriage starting its downward movement.

Proceeding now to consider the apparatus of the invention in more detail, there is shown in FIGS. 1 and 2 a carriage 10 operable on spaced, vertical slide rods, such as slide rod 11, to reciprocate in the up-and-down direction as noted by the motion arrows. This reciprocatory operating movement is imparted to the carriage 10 through a carriage drive link 12, which is to be understood to be connected in any suitable manner to the main drive of the packaging machine.

A pair of sealing jaws 15, 16 are mounted for movement toward and away from each other on a pair of horizontal slide rods, such as rod 17. The sealing jaw 15, which may be positioned at the front of the machine and thus referred to as the forward sealing jaw 15, is driven toward and away from jaw 16 by a U-shaped link 20; whereas, the rear sealing jaw 16 is simultaneously driven in the opposite direction toward and away from jaw 15 by a corresponding action link 21. As shown, the links 20, 21 are connected to opposite sides of a double crank 22 by pivot pins 23, 23a; the crank 22 being fixedly pivoted on pivot shaft 24, thus forming a toggle linkage with dual action, generally designated by the reference numeral T. The crank 22 may be rotated by a pneumatic power cylinder 25 which has its piston rod 26 suitably attached by a pivot joint 27.

As shown in FIG. 2, as the sealing jaws 15, 16 approach the operative position, the "knee" of the two toggles at pivot pins 23, 23a is tending toward being straightened or "going over center" so that the mechanical advantage, and thus the sealing pressure, of the sealing jaws 15, 16 is being increased. However, the momentum of the jaws 15, 16 is being reduced proportional to the increase in mechanical advantage so as to work to the fullest advantage with the present invention. That is, with the toggle linkage T, the maximum velocity and thus maximum momentum of the jaws 15, 16 occurs at the start of the inward movement with the crank 22 at 90° to the direction of travel of said jaws, and progressively decreases to substantially zero as the over center condition approaches. Therefore, the impact or shock force due to interruption of travel of the jaws 15, 16 is reduced over what would be experienced with comparable devices with direct drive arrangements.

As shown in FIGS. 1, 2 and 2a, stripper plates 30, 31 are mounted on the lower face of the respective sealing jaws 15, 16. As best shown in FIG. 2a, the stripper plate 31 may be fixedly mounted by any number of suitable fasteners 32. However, the opposite stripper plate 30 is mounted for rearward sliding action by reason of slots 33 through which the fasteners 34 pass. A leaf spring 35 is positioned behind the stripper plate 30 to bias the same forwardly at all times. As shown in FIG. 2a, during the stripping operation of the packaging machine, a tube of the packaging film F is positioned between the edges of the stripper plates 30, 31 and is flattened so that the product in the lower package is forced downwardly into the required bag space prior to the sealing operation.

An interrupter cam assembly 40 is mounted in a stationary position adjacent the sealing carriage 10, and in the present instance, on rear wall 41 of the packaging machine (see FIGS. 1 and 2). A follower roller 42 in alignment with the cam assembly 40 is carried by yoke 43 fastened to the end of the piston rod 26 of the cylinder 25. When the cylinder 25 is retracted so that the sealing jaws 15, 16 are in their withdrawn position of FIG. 1, the follower roller 42 is positioned away from the cam assembly 40, as clearly shown in FIG. 1.

When the carriage 10 is at the uppermost point in its travel cycle, it is as shown in FIG. 2, and ready to begin its downward movement as illustrated by the movement arrows. At this uppermost point, the control of the packaging machine (not shown) is operative to actuate the cylinder 25 so as to move the sealing jaws 15, 16 toward each other. The follower roller 42 continues to move until the cam assembly 40 is engaged to interrupt it, which thus positions the sealing jaws close but spaced from each other short of sealing engagement, and the stripping plates 30, 31 in operative position (FIG. 2) with the film F flattened therebetween, as shown in FIG. 2a.

The particular construction of the cam assembly 40 forming a part of the present invention is shown in FIGS. 3 and 4. A base member 50 is provided having a pair of longitudinal mounting slots 51 (only one shown in FIG. 3) positioned along the sides thereof. These slots 51 allow the assembly 40 to be properly positioned on the wall 41 and adjusted up or down in accordance with the length of stripping stroke desired. On the base member 50 there is a pair of centrally located upstanding walls 52, 53, which together with the base member 50 form a U-shaped channel along the length of the member 50. An elongated cam member 54 is guidably positioned within the channel and adapted for limited shock absorbing movement transverse to the longitudinal axis.

A positioning pin 55 is fixed at one end of the cam element 54 and extends through slots 56 in the walls 52, 53. The operative face of the cam element 54 is sloped downwardly at 57 in order to permit controlled release of the follower roller 42 from influence of the cam element 54.

A resilient pad 60 underlies the cam element 54 to perform an important function in the cam assembly 40. This pad 60, which may be synthetic rubber or any other suitable resilient material, absorbs the shock or initial impact force of the follower roller 42 hitting the upper guide edge of the cam element 54. It will be remembered that the roller 42 is moving forwardly with substantial velocity at the moment of impact and this dissipation of energy is very important to substantially reduce the wear of the parts and decrease the working noise of the machine.

The pad 60 is preferably centered along the length of the cam assembly 40 and is preferably the same length as the cam element 54, as shown in FIGS. 3 and 4. The roller 42 is aligned to initially impact the operative face of the cam element 54 adjacent the upper edge of said pad 60. The movement of the pin 55 along the slot 56 guarantees resiliency and energy absorption at the impact point. As the carriage 10 makes its downward movement, on the stripping portion of the stroke, as shown in FIG. 2, the cam element 54 will recover slightly from the initial impact under pressure of the pad 60. The cylinder 25 is operated with compressed air and serves to resiliently urge the follower roller into firm engagement with the cam element 54 as the carriage 10 continues to move downwardly. The downward slope or exit section 57 releases the sealing jaws 15, 16 from the cam element 54 to terminate the stripping portion of the stroke. An angle of approximately 45° has been found to be suitable to allow the jaws 15, 16 to be brought together in a controlled fashion, as the carriage 10 6 finally moves out of the range of the cam assembly 40. Since the stripper plate 30 is resiliently mounted by the spring 35, the final movement of the sealing jaws 15, 16 to sealing engagement is accommodated by the rearward movement of said stripper plate 30, as noted by the arrow in FIG. 2.

From the foregoing, it can be seen that an improvement has been made wherein the stripper plates 30, 31 may, if desired, be positioned directly on the sealing jaws 15, 16 and properly operated with the simple and efficient interrupter cam assembly 40. The follower roller 42, when it engages the cam element 54, properly positions the stripper plates 30, 31 to strip the product prior to sealing. The toggle linkage T reduces the momentum to minimize the shock of the parts coming together, and the use of compressed air to drive the power cylinder 25 further reduces the shock. As the carriage 10 continues to move downwardly, the stripping operation is completed and the sloping exit section 57 permits controlled release of the sealing jaws 15, 16 under the bias of the cylinder 25. The cam assembly 40 is provided with a resilient pad 60 to back up the cam element 54 to also absorb the shock and cushion the blow of the follower roller 42 making contact therewith, as the jaws 15, 16 are interrupted.

In this disclosure, there is shown and described only the preferred embodiment of the invention, but, as aforementioned, it is to be understood that the invention is capable of various changes or modifications within the scope of the inventive concept as expressed by the accompanying claims.

I claim:
1. In a form and fill packaging system wherein an elongated tube of packaging material is formed, filled, sealed and divided into individual packages, the combination comprising a pair of sealing jaws, actuating means to move said sealing jaws toward and away from said tube passing therebetween to effect sealing, operating means to move said sealing jaws and said tube relative to each other in the direction of the longitudinal axis of said tube to allow drawing of a new length of material to form said packages, means interconnected with said sealing jaws, cam means to intercept said interconnection means moving from a position free of operative engagement with said cam means and substantially in the direction of the inward movement of said sealing jaws toward said tube to thereby interrupt the inward movement of said jaws short of sealing engagement, said cam means extending in the direction of travel of the jaws along the longitudinal axis of said tube, and means for releasing said jaws from said cam means, whereby the jaws may assume sealing engagement and the package may be sealed and formed.

2. The combination of claim 1 wherein is further provided a stripper plate on each of said sealing jaws, resilient means for urging said stripper plates toward each other and into flattening engagement with said tube when said jaws are interrupted by said cam means.

3. The combination of claim 1 wherein said cam means includes an elongated cam element, a base member mounting said cam element, and resilient means mounted between said cam element and said base member for absorbing the shock resulting from the interruption.

4. The combination of claim 3 wherein said base member includes a substantially U-shaped channel to receive said cam element between the upstanding legs thereof, a pivot pin extending through one end of said cam element and engaging cooperating elongated holes in the legs of the U-shaped base channel, and said resilient means includes a compressible pad mounted behind said cam element for absorbing the shock of said interruption.

5. The combination of claim 1 wherein said actuating means for said jaws causes a deceleration of the same when approaching sealing engagement, whereby the shock upon engagement with said cam means is minimized.

6. The combination of claim 5 wherein said actuating means comprises a toggle linkage connected to said sealing jaws and a fluid cylinder for operating said linkage.

7. The combination of claim 6 wherein is provided a follower roller on the end of the piston rod of said cylinder, said follower roller being adapted to engage said cam means to cause said interruption.

8. The combination of claim 7 wherein said toggle linkage is adapted for maximum velocity of the sealing jaws when the same are substantially open and progressively decreasing velocity as the sealing jaws come together.

9. The combination of claim 6 wherein the fluid cylinder is operated with compressed air to further minimize the shock.

10. The combination of claim 1 wherein said releasing means includes a sloping exit section on said cam to gradually release said jaws from the interrupted position upon movement of the sealing jaws along the longitudinal axis of said tube.

* * * * *